United States Patent
Chen et al.

(10) Patent No.: US 10,503,031 B2
(45) Date of Patent: Dec. 10, 2019

(54) DISPLAY DEVICE

(71) Applicant: AU Optronics Corporation, Hsin-Chu (TW)

(72) Inventors: Ju-Chin Chen, Hsin-Chu (TW); Jui-Ping Yu, Hsin-Chu (TW); Yu-Chia Huang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/039,549

(22) Filed: Jul. 19, 2018

(65) Prior Publication Data

US 2019/0064610 A1    Feb. 28, 2019

(30) Foreign Application Priority Data

Aug. 31, 2017   (TW) .............................. 106129846 A (51) Int. Cl.
  *G02F 1/1343*   (2006.01)
  *G02F 1/1362*   (2006.01)
  (Continued)

(52) U.S. Cl.
  CPC ...... *G02F 1/134336* (2013.01); *G02F 1/1334* (2013.01); *G02F 1/1337* (2013.01);
  (Continued)

(58) Field of Classification Search
  CPC ......... G02F 1/134336; G02F 1/136286; G02F 1/13306; G02F 1/13439; G02F 1/1337;
  (Continued)

(56) References Cited

U.S. PATENT DOCUMENTS 7,602,113 B2    10/2009  Tsai et al.
2001/0043297 A1*  11/2001  Arai .................. G02F 1/133504
                                                349/114
(Continued)

FOREIGN PATENT DOCUMENTS

TW             594185       6/2004
TW         200624912 A      7/2006
(Continued)

*Primary Examiner* — Shan Liu
(74) *Attorney, Agent, or Firm* — WPAT, PC (57) ABSTRACT

A display device includes a first substrate, a second substrate, a liquid crystal layer, a plurality of signal lines, a dielectric layer, a plurality of first pixel electrodes, an auxiliary electrode layer, and a control element. The second substrate and the first substrate are oppositely disposed. The liquid crystal layer is disposed between the first substrate and the second substrate. The signal lines are disposed on the first substrate. The dielectric layer is disposed on the signal lines. The first pixel electrodes are disposed on the dielectric layer, are separated from each other, and are electrically connected to one of the signal lines respectively. The auxiliary electrode layer is disposed between the first substrate and the dielectric layer, and the auxiliary electrode layer is at least partially located, in a vertical projection on the first substrate, between two adjacent first pixel electrodes, and at least some of the signal lines overlap with some of the first pixel electrodes in the direction perpendicular to the first substrate. The control element is disposed on the first substrate and is electrically connected to the signal lines and the auxiliary electrode layer.

17 Claims, 8 Drawing Sheets

(51) Int. Cl.
*G02F 1/133* (2006.01)
*G02F 1/1337* (2006.01)
*G02F 1/1334* (2006.01)
*G02F 1/1345* (2006.01)

(52) U.S. Cl.
CPC ...... *G02F 1/13306* (2013.01); *G02F 1/13439* (2013.01); *G02F 1/136286* (2013.01); *G02F 2001/13456* (2013.01); *G02F 2201/123* (2013.01)

(58) Field of Classification Search
CPC ............. G02F 1/1334; G02F 2201/123; G02F 1/1343; G02F 1/134309; G02F 1/155; G02F 1/1393; G02F 1/1395; G02F 1/136; G02F 1/218; G02F 1/134363; G02F 1/134327; G02F 1/133707; G02F 1/0316; G02F 2001/134318; G02F 2001/134372; G02F 2001/134381; G02F 2001/134345; G02F 2001/1357; G02F 2001/136218; G02F 2001/136295; G02F 2001/1552; G02F 2001/1555; G02F 2001/1557; G02F 2001/13629
USPC .................................................. 349/139–148
See application file for complete search history.

(56) References Cited

U.S. PATENT DOCUMENTS

| | | | | |
|---|---|---|---|---|
| 2002/0113238 | A1* | 8/2002 | Yu | G02F 1/134336 257/72 |
| 2002/0175620 | A1 | 11/2002 | Yokoyama et al. | |
| 2003/0112398 | A1* | 6/2003 | Kim | G02F 1/134309 349/129 |
| 2007/0057257 | A1* | 3/2007 | Kim | G02F 1/134336 257/59 |
| 2007/0229430 | A1* | 10/2007 | Wang | G02F 1/134309 345/96 |
| 2008/0303999 | A1 | 12/2008 | Wang et al. | |
| 2009/0073368 | A1 | 3/2009 | Wang et al. | |
| 2009/0244416 | A1* | 10/2009 | Liao | G02F 1/136286 349/38 |
| 2011/0109859 | A1* | 5/2011 | Ito | G02F 1/134363 349/139 |
| 2013/0083263 | A1* | 4/2013 | Kim | G02F 1/134336 349/38 |
| 2015/0153600 | A1* | 6/2015 | Won | H01L 27/127 349/43 |
| 2016/0291749 | A1* | 10/2016 | Zhou | G06F 3/0412 |
| 2017/0343866 | A1* | 11/2017 | Nam | G02F 1/134309 |
| 2018/0284496 | A1* | 10/2018 | Chen | G02F 1/137 |
| 2019/0113811 | A1* | 4/2019 | Iwata | G02F 1/133707 |

FOREIGN PATENT DOCUMENTS

| | | |
|---|---|---|
| TW | 200736715 A | 10/2007 |
| TW | 200848843 A | 12/2008 |
| TW | I355549 | 3/2009 |
| TW | 200914925 A | 4/2009 |
| TW | 201308142 A | 2/2013 |
| TW | 201530398 | 8/2015 |

* cited by examiner

DISPLAY DEVICE

BACKGROUND

Technical Field

The present invention relates to display related technologies, and in particular, to a display device that can improve falling direction control of liquid crystals between pixels and differences in light transmittance between different pixels.

Related Art

Liquid crystal display devices have advantages such as being light, thin, short, and small, and energy saving, and therefore are widely applied to various electronic products, such as smart watches, smart phones, notebook computers, tablet PCs, and various consumer electronic products.

The liquid crystal display device mainly includes an array substrate, an opposite substrate, and a display dielectric layer that is disposed between the foregoing two substrates and that is made of, for example, a liquid crystal material. A plurality of pixel units is usually formed on the array substrate to present a particular image.

However, with the trend of improvement of the image resolution of the liquid crystal display device, when the sizes of the pixel units are designed, how to further improve falling direction control of liquid crystals between different pixel units and differences in light transmittance between different pixel units without affecting the display function is a major issue in the industry of display technologies for the moment.

SUMMARY

The present invention provides a display device that can improve, with the trend of improvement of the image resolution, falling direction control situations of liquid crystals between different pixel units in the display device and differences in light transmittance between different pixel units.

The display device provided in the present invention includes a first substrate, a second substrate, a liquid crystal layer, a plurality of signal lines, a dielectric layer, a plurality of first pixel electrodes, an auxiliary electrode layer, and a control element. The second substrate and the first substrate are oppositely disposed. The liquid crystal layer is disposed between the first substrate and the second substrate. These signal lines are disposed on the first substrate, and extended in a first direction. The dielectric layer is disposed on the plurality of signal lines. These first pixel electrodes are disposed on the dielectric layer, are separated from each other, and each first pixel electrode is electrically connected to one of these signal lines respectively. The auxiliary electrode layer is disposed between the first substrate and the dielectric layer. The control element is disposed on the first substrate and is electrically connected to these signal lines and the auxiliary electrode layer. The auxiliary electrode layer is at least partially located between two adjacent first pixel electrodes in a vertical projection on the first substrate, and at least some of these signal lines and some of these first pixel electrodes overlap with each other in the vertical projection on the first substrate.

In an embodiment, the auxiliary electrode layer and these signal lines are in one film layer.

In an embodiment, light transmittance of the signal lines and the auxiliary electrode layer is greater than 80%.

In an embodiment, these first pixel electrodes are arranged into a plurality of columns and a plurality of rows in an array form, the auxiliary electrode layer includes a plurality of first auxiliary electrodes extended in the first direction, and these first auxiliary electrodes are located, in the vertical projection on the first substrate, between two adjacent columns of the first pixel electrodes.

In an embodiment, in the vertical projection on the first substrate, the auxiliary electrode layer is not disposed between two adjacent rows of the first pixel electrodes.

In an embodiment, the foregoing display device further includes an alignment layer disposed between these first pixel electrodes and the liquid crystal layer, where the first auxiliary electrodes are extended in the first direction, and the liquid crystal layer is a positive liquid crystal, and the alignment layer is aligned perpendicularly to the first direction.

In another embodiment, the foregoing display device further includes an alignment layer disposed between these first pixel electrodes and the liquid crystal layer, where the first auxiliary electrodes are extended in the first direction, and the liquid crystal layer is a negative liquid crystal, and the alignment layer is aligned parallel to the first direction.

In an embodiment, the auxiliary electrode layer further includes a second auxiliary electrode, the second auxiliary electrode is extended in a second direction perpendicular to the first direction, and in the first direction, the first pixel electrodes are located between the second auxiliary electrode and the control element.

In an embodiment, the first pixel electrodes are arranged into a plurality of columns and a plurality of rows in an array form, the auxiliary electrode layer includes a plurality of third auxiliary electrodes, these third auxiliary electrodes are respectively located, in the vertical projection on the first substrate, between two adjacent rows of the first pixel electrodes, and the third auxiliary electrodes are extended perpendicularly to the first direction.

In an embodiment, the third auxiliary electrodes gradually increase lengths as further awaty from the control element.

In an embodiment, in the vertical projection on the first substrate, the auxiliary electrode layer is not disposed between two adjacent columns of the first pixel electrodes.

In an embodiment, the display device further includes an alignment layer disposed between these pixel electrodes and the liquid crystal layer, where the liquid crystal layer is a positive liquid crystal, and the alignment layer is aligned parallel to the first direction.

In another embodiment, the foregoing display device further includes an alignment layer disposed between these pixel electrodes and the liquid crystal layer, where the liquid crystal layer is a negative liquid crystal, and the alignment layer is aligned perpendicularly to the first direction.

In an embodiment, the auxiliary electrode layer further includes a plurality of fourth auxiliary electrodes, each of these fourth auxiliary electrodes overlaps, in the vertical projection on the first substrate, with one of the first pixel electrodes, and width of the fourth auxiliary electrodes gradually increases along the first direction.

In an embodiment, each of the fourth auxiliary electrodes and the corresponding first pixel electrode have a first overlap area in the direction perpendicular to the first substrate, and the first overlap areas gradually increase as further away from the control element.

In an embodiment, in each of the first pixel electrodes, the signal lines and the corresponding first pixel electrodes have a second overlap area in the direction perpendicular to the first substrate, and each of the first pixel electrodes corresponds to a sum of the first overlap area and the second overlap area and variations between the sums corresponding to the first pixel electrodes are less than 20%.

In an embodiment, the foregoing display device further includes a plurality of second pixel electrodes that are respectively disposed on a periphery of one of the first pixel electrodes and that are respectively electrically connected to one of the signal lines, where the first pixel electrode is different in size from the second pixel electrode.

In an embodiment, the auxiliary electrode layer further includes a plurality of first auxiliary electrodes that are respectively disposed, in the direction perpendicular to the first substrate, between the first pixel electrodes and the second pixel electrodes, and are respectively electrically connected to the control element via one of these signal lines.

In an embodiment, the foregoing display device further includes a display panel disposed laterally above the second substrate of the display device, where the display panel is an active display panel.

In another embodiment, the foregoing display device further includes a display panel disposed laterally below the first substrate of the panel, where the liquid crystal layer is a polymer network liquid crystal or a polymer dispersed liquid crystal.

DETAILED DESCRIPTION

Figure 1:
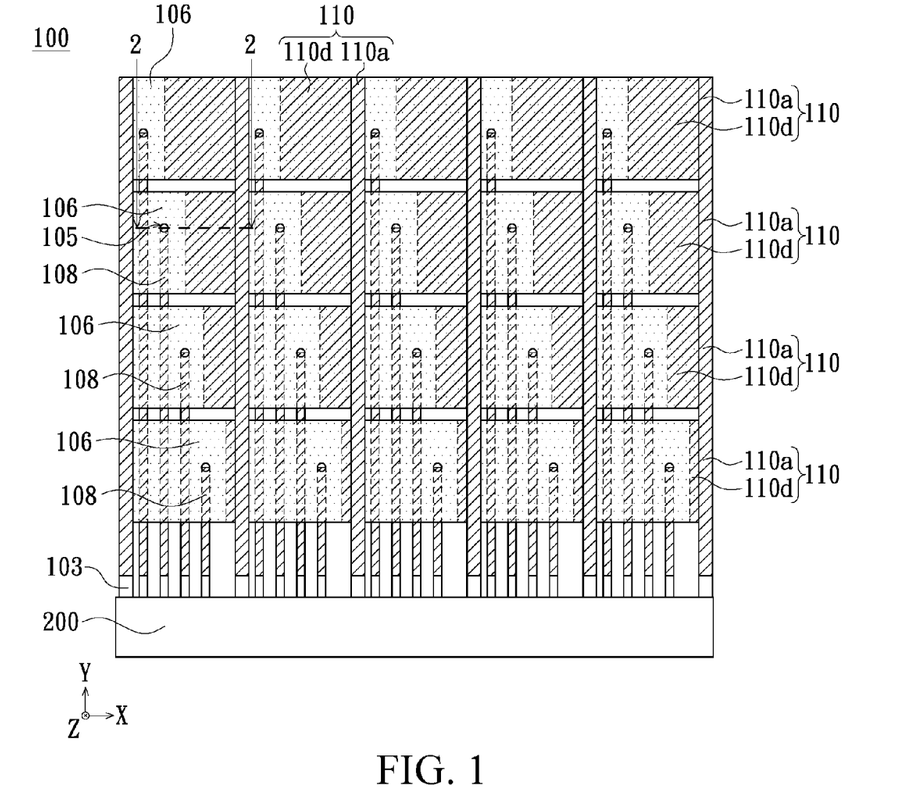
FIG. 1 shows a schematic top view of a display device according to an embodiment of the present invention.
Figure 2:
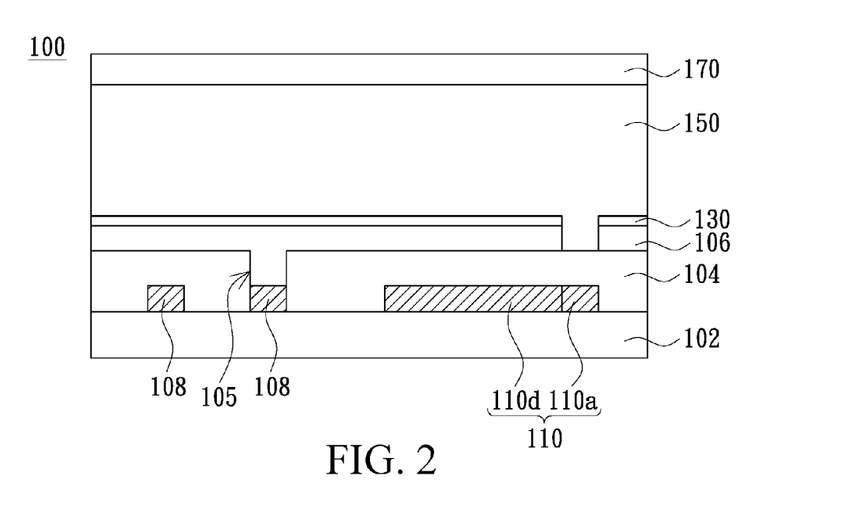
FIG. 2 shows a cross-sectional schematic view along a line segment 2-2 in the display device shown in FIG. 1.

Referring to FIG. 1 and FIG. 2, a display device 100 according to an embodiment of the present invention is shown. FIG. 1 shows a schematic top view of the display device 100, and FIG. 2 shows a cross-sectional schematic view along a line segment 2-2 in the display device 100.

As shown in FIG. 1 and FIG. 2, in this embodiment, the display device 100 mainly includes a first substrate 102, a second substrate 170, a liquid crystal layer 150, a plurality of signal lines 108, a dielectric layer 104, a plurality of first pixel electrodes 106, an auxiliary electrode layer 110, and a control element 200. Herein, the second substrate 170 and the first substrate 102 are oppositely disposed. The liquid crystal layer 150 is disposed between the first substrate 102 and the second substrate 170, and the second substrate 170 may further include another component such as a color filter (not shown). These signal lines 108 are disposed on the first substrate 102 in a manner of being separated from each other, and respectively have an extension direction, for example, a Y direction in FIG. 1. The dielectric layer 104 is disposed on these signal lines 108. These first pixel electrodes 106 are disposed on the dielectric layer 104, are separated from each other, are respectively arranged along an X direction and the Y direction to form an array, and are respectively electrically connected to one of these signal lines 108. The auxiliary electrode layer 110 is disposed between the first substrate 102 and the dielectric layer 104, and the auxiliary electrode layer 110 is at least partially located between two adjacent first pixel electrodes 106 in a vertical projection on the first substrate 102, for example, a projection on the first substrate in a Z direction in FIG. 1. Moreover, at least some of these signal lines 108 overlap with some of these first pixel electrodes 106 in the direction perpendicular to the first substrate 102 (for example, the Z direction in FIG. 1). That is, at least some of these signal lines 108 and some of these first pixel electrodes 106 overlap with each other in a vertical projection on the first substrate 102. The control element 200 is disposed on the first substrate 102 and is electrically connected to these signal lines 108 and these auxiliary electrode layers 110 through a metal layer 103. As shown in FIG. 2, the dielectric layer 104 between each signal line 108 and the corresponding first pixel electrode 106 is provided with a through hole 105 therein. The through hole 105 corresponds to a part of the signal line 108, and the first pixel electrode 106 is filled in the through hole 105, to connect the first pixel electrode 106 to the corresponding signal line 108.

As shown in FIG. 1 and FIG. 2, these auxiliary electrode layers 110 and these signal lines 108 are formed by a same film layer, and these signal lines 108 and the auxiliary electrode layers 110 are made of transparent conductive materials such as indium tin oxide (ITO). These transparent conductive materials have light transmittance greater than 80%. In addition, these first pixel electrodes 106 are arranged into a plurality of columns and a plurality of rows in an array form, for example, a pixel array including five columns and four rows shown in FIG. 1. Based on wiring requirements, in a same column direction, the quantities of the signal lines 108 that pass below each first pixel electrode 106 are different. For example, there are less signal lines that pass below the first pixel electrode 106 far away from the control element 200, and there are more signal lines that pass below the first pixel electrode 106 close to the control element 200. Herein, these auxiliary electrode layers 110 include a plurality of first auxiliary electrodes 110a. Extension directions of these first auxiliary electrodes 110a are, for example, the Y direction shown in FIG. 1. Moreover, these first auxiliary electrodes 110a are located, in the vertical projection in the Z direction on the first substrate 102, between two adjacent columns of these first pixel electrodes 106. In the Y direction, each first auxiliary electrode 110a may be independent of each other and is electrically connected to the control element 200. However, this is merely an example, and is not intended to limit the present invention. In addition, in this embodiment, in the vertical projection in the Z direction on the first substrate 102, the auxiliary electrode layer 110 is not disposed between two adjacent rows of these first pixel electrodes 106. Further, as shown in FIG. 1 and FIG. 2, in this embodiment, the auxiliary electrode layer 110 in the display device 100 further includes a plurality of fourth auxiliary electrodes 110d respectively connected to the first auxiliary electrodes 110a. Each of these fourth auxiliary electrodes 110d overlaps, in the vertical projection in the Z direction on the first substrate 102, with one of these first pixel electrodes 106. The width sizes of these fourth auxiliary electrodes 110d change progressively. This embodiment shows that the width sizes gradually increase along the Y direction, that is, increase progressively from bottom to up. Herein, the width size is the maximum width of each fourth auxiliary electrode in the X direction. Each of these fourth auxiliary electrodes 110d and the corresponding first pixel electrode 106 have a first overlap area in the Z direction perpendicular to the first substrate 102, and the first overlap areas gradually increase as a distance from the control element 200 increases. In addition, in each of these first pixel electrodes 106, these signal lines 108 and the corresponding first pixel electrodes 106 have a second overlap area in the Z direction perpendicular to the first substrate 102, and each of the first pixel electrodes corresponds to a sum of the first overlap area and the second overlap area and variations between the sums for these first pixel electrodes 106 are less than 20%, preferably the variation is less than 10% or 5%. It should be noted that an overlap region of each fourth auxiliary electrode 110d and the corresponding first pixel electrodes 106 does not overlap with an overlap region of these signal lines 108 and the corresponding first pixel electrodes 106. That is, corresponding to a same first pixel electrode 106, configurations of the fourth auxiliary electrodes 110d and the signal lines 108 may form a similar complementary pattern. For example, a pixel corresponding to the first pixel electrode 106 farthest away from the control element 200 has a maximum first overlap area and a minimum second overlap area, and a pixel corresponding to the first pixel electrode 106 closest to the control element 200 has a minimum first overlap area and a maximum second overlap area.

As shown in FIG. 1 and FIG. 2, in an embodiment, the display device 100 may further include an alignment layer 130 disposed between these first pixel electrodes 106 and the liquid crystal layer 150. When the liquid crystal layer 150 is a positive liquid crystal (i.e., liquid crystal with positive dielectric anisotropy), an alignment direction of the alignment layer 130 is perpendicular to the Y direction, and the extension directions of these first auxiliary electrodes 110a are the Y direction shown in FIG. 1, or in another embodiment, when the liquid crystal layer is a negative liquid crystal (i.e., liquid crystal with negative dielectric anisotropy), the alignment direction of the alignment layer 130 is parallel to the Y direction, and the extension directions of these first auxiliary electrodes 110a are all the Y direction in FIG. 1, the display device 100 may provide a relatively good display effect while being driven, so as to avoid poor images caused by poor falling directions of liquid crystals.

As shown in FIG. 1 and FIG. 2, by means of configurations of the plurality of first auxiliary electrodes 110a respectively connected to the control element 200, proper potentials, for example, pixel potentials or common potentials, may be given to these first auxiliary electrodes 110a by using a control unit 200 during operation of the display device 100. In this way, a problem of falling directions of liquid crystals between adjacent first pixel electrodes 106 may be improved, and a problem of bright lines that may occur between the adjacent first pixel electrodes 106 during the operation of the display device 100 is eliminated, thereby improving the display performance of the display device 100. In addition, by means of configurations of these fourth auxiliary electrodes 110d that respectively overlap, in the Z direction perpendicular to the first substrate, with one of these first pixel electrodes 106 and that have incremental width sizes along the Y direction, differences in total areas of transparent conductive materials in different pixels may be relatively decreased. However, during the operation of the display device 100, by giving, by using the control unit 200, proper potentials, for example, pixel potentials or common potentials, to these fourth auxiliary electrodes 110d connected to these first auxiliary electrodes 110a, differences that are in light transmittance between different pixel units and that are caused by different quantities of signal lines 108 that pass between different pixel units may be improved, so that display situations of various pixel units in the display device 100 are relatively equal and close. In an embodiment, the first auxiliary electrode 110a may be cut flush with the adjacent first pixel electrode 106, as shown in FIG. 1 and FIG. 2. However, the present invention is not limited to the embodiment shown in FIG. 1 and FIG. 2. In other embodiments, the first auxiliary electrode 110a is approximately and substantially flush with the adjacent first pixel electrode 106 but is not cut flush with the adjacent first pixel electrode 106 as shown in FIG. 1 and FIG. 2, or possibly is not flush with or is not cut flush with the adjacent first pixel electrode 106 due to problems of process variations.

Figure 3:
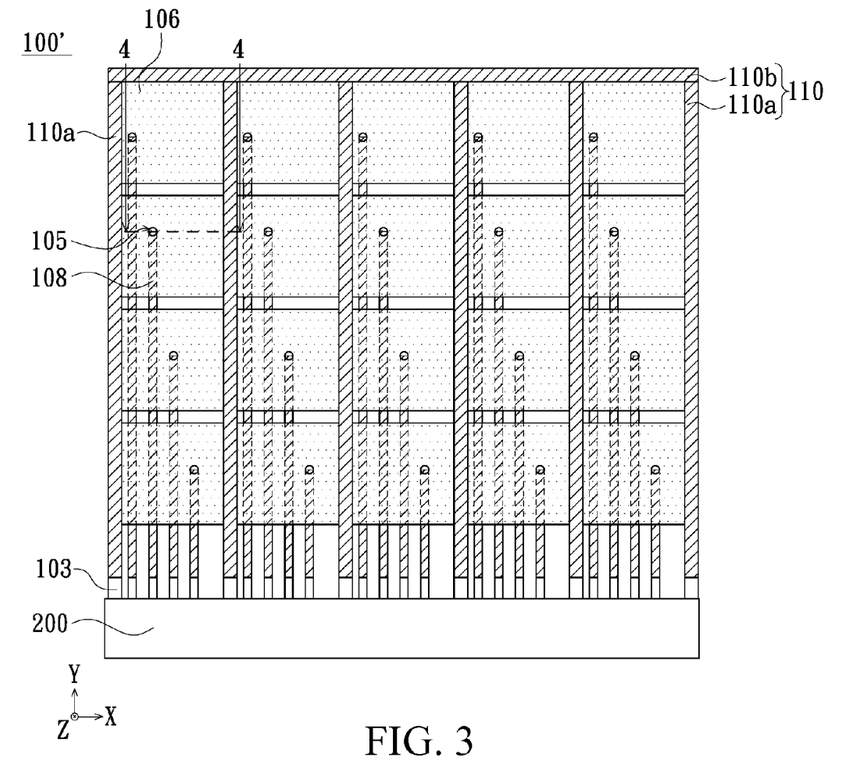
FIG. 3 shows a schematic top view of a display device according to another embodiment of the present invention.
Figure 4:
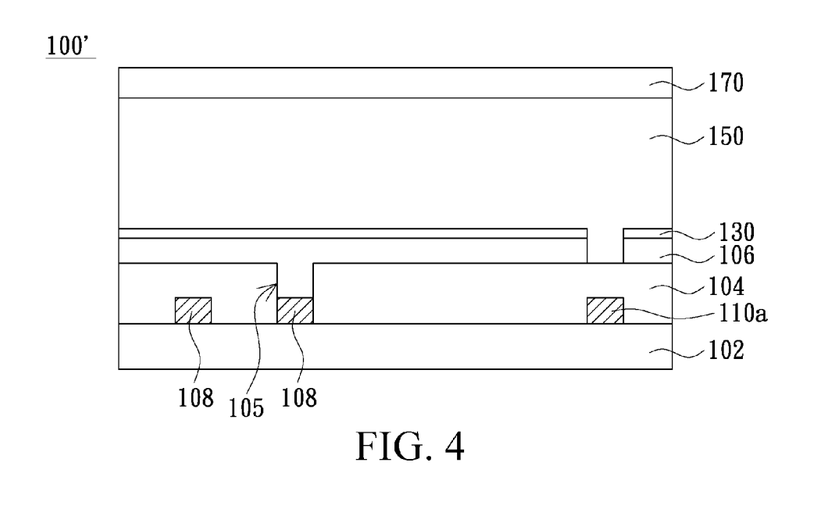
FIG. 4 shows a cross-sectional schematic view along a line segment 4-4 in the display device shown in FIG. 3.

Referring to FIG. 3 and FIG. 4, a display device 100' according to another embodiment of the present invention is shown. FIG. 3 shows a schematic top view of the display device 100', and FIG. 4 shows a cross-sectional schematic view along a line segment 4-4 in the display device 100'. The display device 100' shown in FIG. 3 and FIG. 4 is generally similar to the display device 100 shown in FIG. 1 and FIG. 2 in spite of a slight difference in the composition and setting position of the auxiliary electrode layer 110. In the following text, same reference numerals represent same elements. Moreover, to be brief, only differences between the display device 100' shown in FIG. 3 and FIG. 4 and the display device 100 shown in FIG. 1 and FIG. 2 are described in the following text, and implementation situations of same components in the two display devices are not described again.

As shown in FIG. 3 and FIG. 4, in this embodiment, the auxiliary electrode layer 110 in the display device 100' does not include the plurality of fourth auxiliary electrodes 110d shown in FIG. 1 and FIG. 2, but includes second auxiliary electrodes 110b connected to these first auxiliary electrodes 110a. Extension directions of these second auxiliary electrodes 110b are an extension direction Y perpendicular to these first auxiliary electrodes 110a, for example, an X direction shown in FIG. 3. Moreover, in the Y direction shown in FIG. 3, these first pixel electrodes 106 are located between the second auxiliary electrodes 110b and the control element 200.

As shown in FIG. 3 and FIG. 4, by means of configurations of the plurality of first auxiliary electrodes 110a and the second auxiliary electrodes 110b that are respectively connected to the control element 200, proper potentials, for example, pixel potentials or common potentials, may be given to these first auxiliary electrodes 110a by using the control unit 200 during operation of the display device 100. In this way, a problem of falling directions of liquid crystals between adjacent first pixel electrodes 106 may be improved, and a problem of bright lines that may occur between the adjacent first pixel electrodes 106 during the operation of the display device 100' is eliminated, thereby improving the display performance of the display device 100'.

Figure 5:
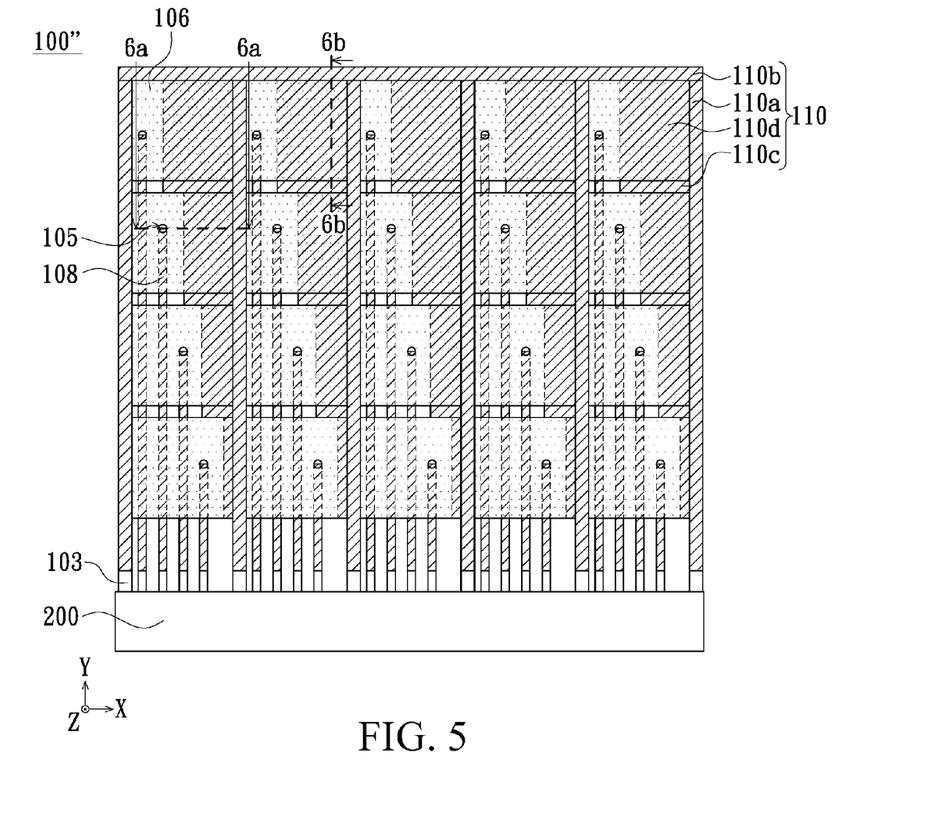
FIG. 5 shows a schematic top view of a display device according to still another embodiment of the present invention.
Figure 6A:
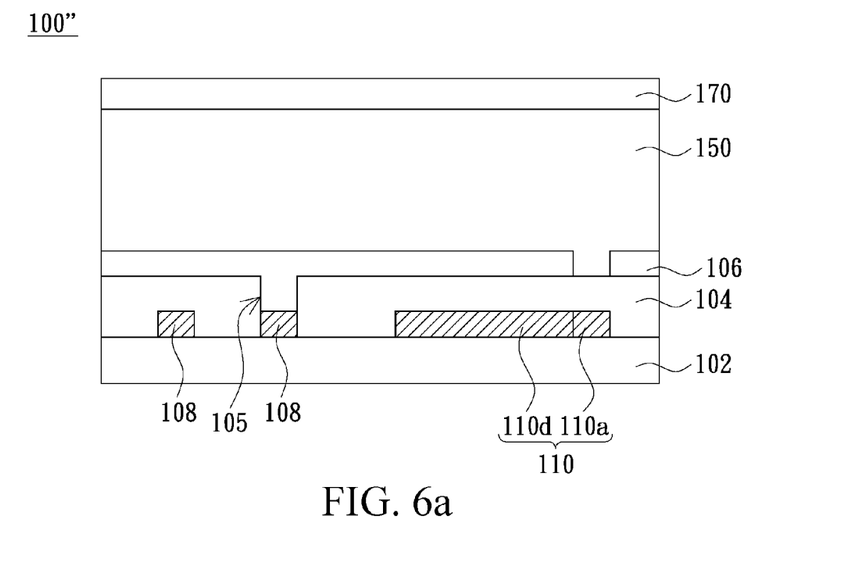
FIG. 6a shows a cross-sectional schematic view along a line segment 6a-6a in the display device shown in FIG. 5.
Figure 6B:
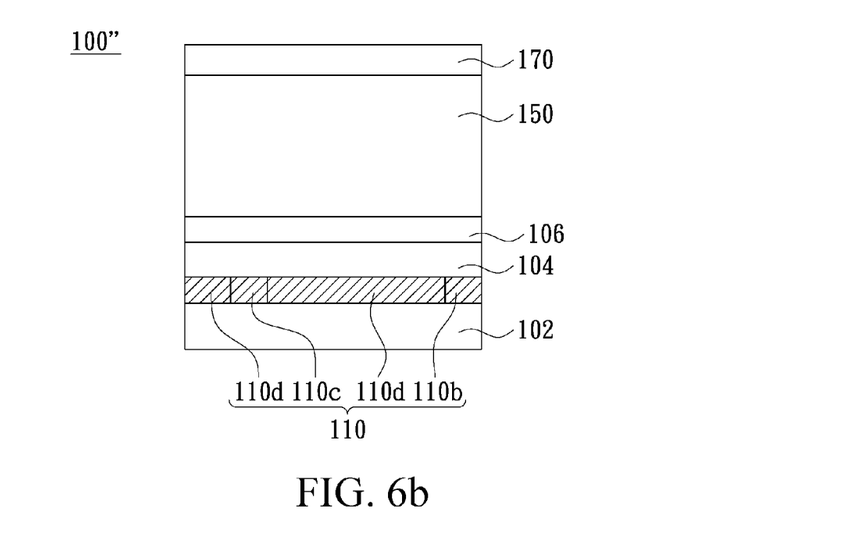
FIG. 6b shows a cross-sectional schematic view along a line segment 6b-6b in the display device shown in FIG. 5.

Referring to FIG. 5, FIG. 6a, and FIG. 6b, a display device 100" according to still another embodiment of the present invention is shown. FIG. 5 shows a schematic top view of the display device 100", FIG. 6a shows a cross-sectional schematic view along a line segment 6a-6a in the display device 100", and FIG. 6b shows a cross-sectional schematic view along a line segment 6b-6b in the display device 100". The display device 100" shown in FIG. 5, FIG. 6a, and FIG. 6b is generally similar to the display device 100 shown in FIG. 1 and FIG. 2 in spite of a slight difference in the composition and setting position of the auxiliary electrode layer 110. In the following text, same reference numerals represent same elements. Moreover, to be brief, only differences between the display device 100" shown in FIG. 5, FIG. 6a, and FIG. 6b and the display device 100 shown in FIG. 1 and FIG. 2 are described in the following text, and implementation situations of same components in the two display devices are not described again.

As shown in FIG. 5, FIG. 6a, and FIG. 6b, in this embodiment, the auxiliary electrode layer 110 in the display device 100" not only includes the plurality of fourth auxiliary electrodes 110d shown in FIG. 1 and FIG. 2, but also includes the second auxiliary electrodes 110b connected to these first auxiliary electrodes 110a and a plurality of third auxiliary electrodes 110c respectively connected to one of these first auxiliary electrodes 110a. Extension directions of these second auxiliary electrodes 110b are a Y direction extending perpendicular to these first auxiliary electrodes 110a, for example, the X direction shown in FIG. 1. Moreover, in the Y direction shown in FIG. 1, these first pixel electrodes 106 are located between the second auxiliary electrodes 110b and the control element 200. However, seen from the Z direction perpendicular to the first substrate 102, these third auxiliary electrodes 110c are respectively located, in the vertical projection on the first substrate 102, between two adjacent rows of these first pixel electrodes 106, and extension directions of these third auxiliary electrodes 110c are also the X direction shown in FIG. 1.

As shown in FIG. 5, FIG. 6a, and FIG. 6b, by means of configurations of the plurality of first auxiliary electrodes 110a, the second auxiliary electrodes 110b, the plurality of third auxiliary electrodes 110c, and the plurality of fourth auxiliary electrodes 110d that are respectively connected to the control element 200, proper potentials, for example, pixel potentials or common potentials, may be given to these fourth auxiliary electrodes 110d by using the control unit 200 during operation of the display device 100. In addition, by means of configurations of these fourth auxiliary electrodes 110d that respectively overlap, in the Z direction perpendicular to the first substrate, with one of these first pixel electrodes 106 and that have incremental width sizes along the Y direction, differences in total areas of transparent conductive materials in different pixels may be relatively decreased. During the operation of the display device 100, by giving, by using the control unit 200, proper potentials, for example, pixel potentials or common potentials, to these fourth auxiliary electrodes 110d connected to these first auxiliary electrodes 110a, differences that are in light transmittance between different pixel units and that are caused by different quantities of signal lines 108 that pass between different pixel units may be improved, so that display situations of various pixel units in the display device 100 are relatively equal.

Figure 7:
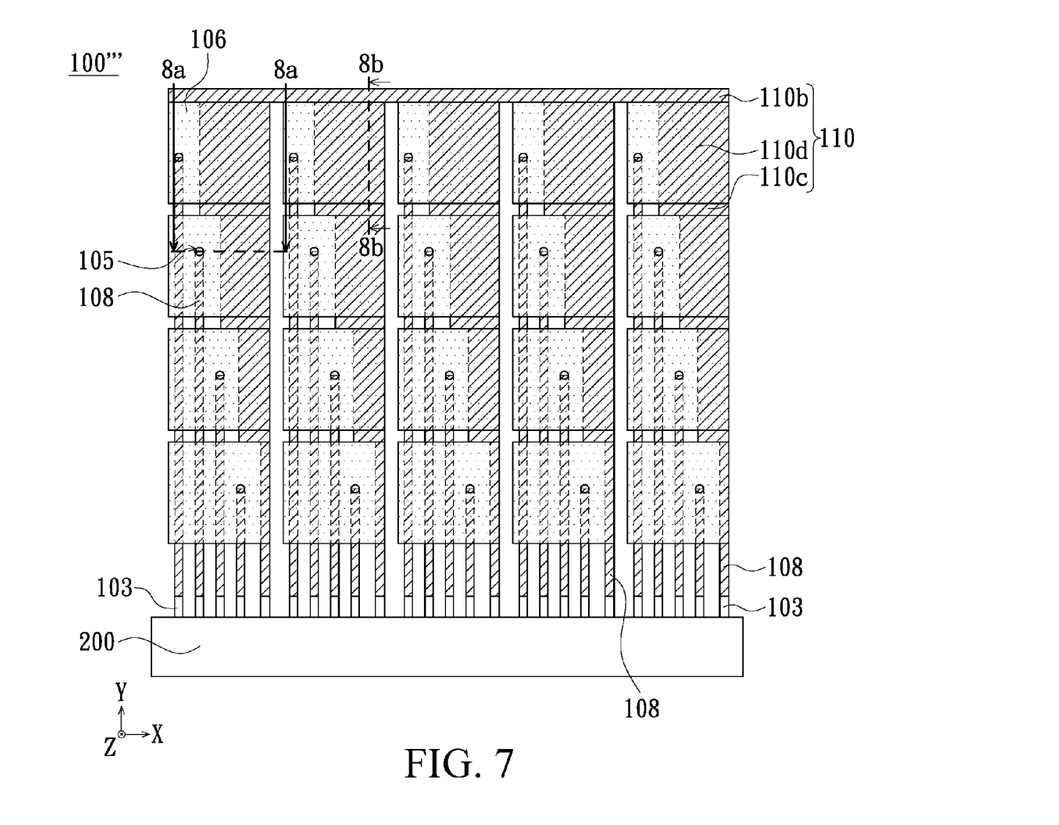
FIG. 7 shows a schematic top view of a display device according to still yet another embodiment of the present invention.
Figure 8A:
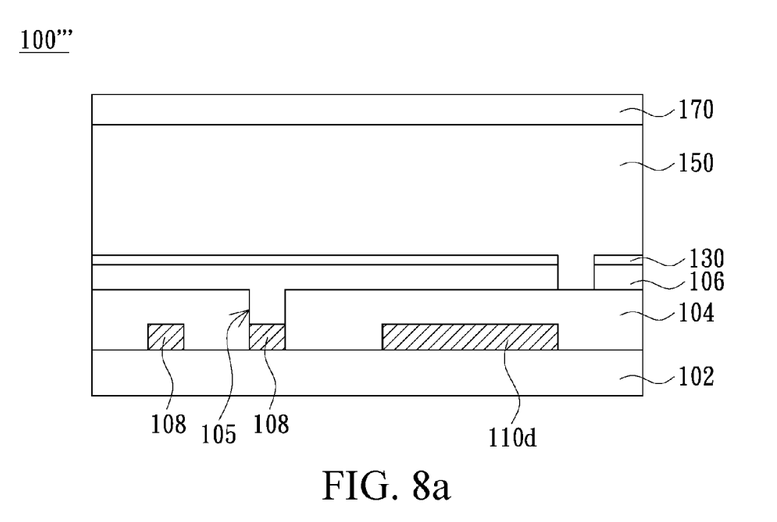
FIG. 8a shows a cross-sectional schematic view along a line segment 8a-8a in the display device shown in FIG. 7.
Figure 8B:
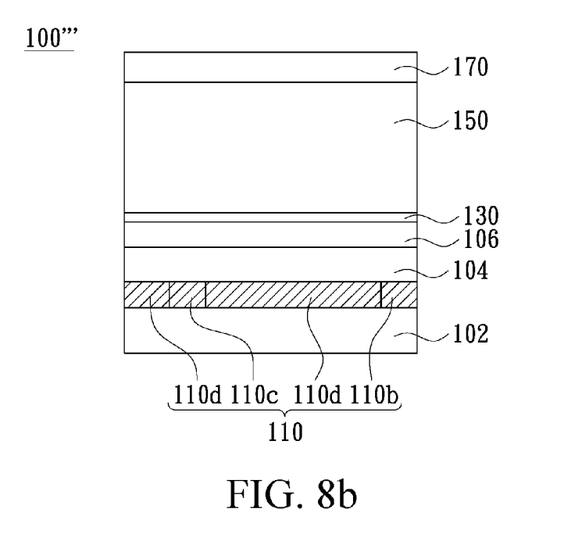
FIG. 8b shows a cross-sectional schematic view along a line segment 8b-8b in the display device shown in FIG. 7.

Referring to FIG. 7, FIG. 8a, and FIG. 8b, a display device 100''' according to still yet another embodiment of the present invention is shown. FIG. 7 shows a schematic top view of the display device 100''', FIG. 8a shows a cross-sectional schematic view along a line segment 8a-8a in the display device 100''', and FIG. 8b shows a cross-sectional schematic view along a line segment 8b-8b in the display device 100'''. The display device 100''' shown in FIG. 7, FIG. 8a, and FIG. 8b is generally similar to the display device 100" shown in FIG. 5, FIG. 6a, and FIG. 6b in spite of a slight difference in the composition and setting position of the auxiliary electrode layer 110. In the following text, same reference numerals represent same elements. Moreover, to be brief, only differences between the display device 100''' shown in FIG. 7, FIG. 8a, and FIG. 8b and the display device 100" shown in FIG. 5, FIG. 6a, and FIG. 6b are described in the following text, and implementation situations of same components in the two display devices are not described again.

As shown in FIG. 7, FIG. 8a, and FIG. 8b, in this embodiment, the auxiliary electrode layer 110 in the display device 100''' does not include the plurality of first auxiliary electrodes 110a shown in FIG. 5, FIG. 6a, and FIG. 6b. In addition, setting situations of the second auxiliary electrodes 110b, the third auxiliary electrodes 110c, and the fourth auxiliary electrodes 110d that are included in the auxiliary electrode layer 110 of the display device 100''' are the same as those of the second auxiliary electrodes 110b, the third auxiliary electrodes 110c, and the fourth auxiliary electrodes 110d in the display device 100" shown in FIG. 5, FIG. 6a, and FIG. 6b. Moreover, an electrical connection relationship between the auxiliary electrode layer 110 and the control element 200 is formed by using the second auxiliary electrodes 110b, the third auxiliary electrodes 110c, and the fourth auxiliary electrodes 110d in the display device 100'''. In an embodiment, the auxiliary electrodes 110d of pixels in a lowest row may be electrically connected to the control unit 200 by respectively using the signal lines 108 and the metal layer 103, as shown in FIG. 7. However, in other embodiments, merely one of the auxiliary electrodes 110d of the pixels in the lowest row is electrically connected to the control unit 200 by using the signal lines 108 and the metal layer 103, and a situation in which pixel units in different columns are electrically connected to the control unit 200 is formed by using the auxiliary electrodes 110b of pixels in a topmost row.

As shown in FIG. 7, FIG. 8a, and FIG. 8b, by means of configurations of the second auxiliary electrodes 110b, the plurality of third auxiliary electrodes 110c, and the plurality of fourth auxiliary electrodes 110d that are respectively connected to the control element 200, proper potentials, for example, pixel potentials or common potentials, may be given to these fourth auxiliary electrodes 110d by using the control unit 200 during operation of the display device 100. In this way, a problem of falling directions of liquid crystals between adjacent first pixel electrodes 106 may be improved, and a problem of bright lines that may occur between the adjacent first pixel electrodes 106 during the operation of the display device 100 is eliminated, thereby improving the display performance of the display device 100. As shown in FIG. 7, FIG. 8a, and FIG. 8b, in an embodiment, the display device 100''' may further include an alignment layer 130 disposed between these first pixel electrodes 106 and the liquid crystal layer 150. When the liquid crystal layer 150 is a positive liquid crystal, an alignment direction of the alignment layer 130 is parallel to the Y direction, and the extension directions of these first auxiliary electrodes 110 are the X direction shown in FIG. 7, or in another embodiment, when the liquid crystal layer is a negative liquid crystal, the alignment direction of the alignment layer 130 is perpendicular to the Y direction, and the extension directions of these first auxiliary electrodes 110 are all the X direction in FIG. 7, the display device 100''' may provide a relatively good display effect while being driven, so as to avoid poor images caused by poor falling directions of liquid crystals. In addition, by means of configurations of these fourth auxiliary electrodes 110d that respectively overlap, in the Z direction perpendicular to the first substrate, with one of these first pixel electrodes 106 and that have incremental width sizes along the Y direction, differences in total areas of transparent conductive materials in different pixels may be relatively decreased. During the operation of the display device 100, by giving, by using the control unit 200, proper potentials, for example, pixel potentials or common potentials, to these fourth auxiliary electrodes 110d connected to these third auxiliary electrodes 110c, differences that are in light transmittance between different pixel units and that are caused by different quantities of signal lines 108 that pass between different pixel units may be improved, so that display situations of various pixel units in the display device 100 are relatively equal.

Figure 9:
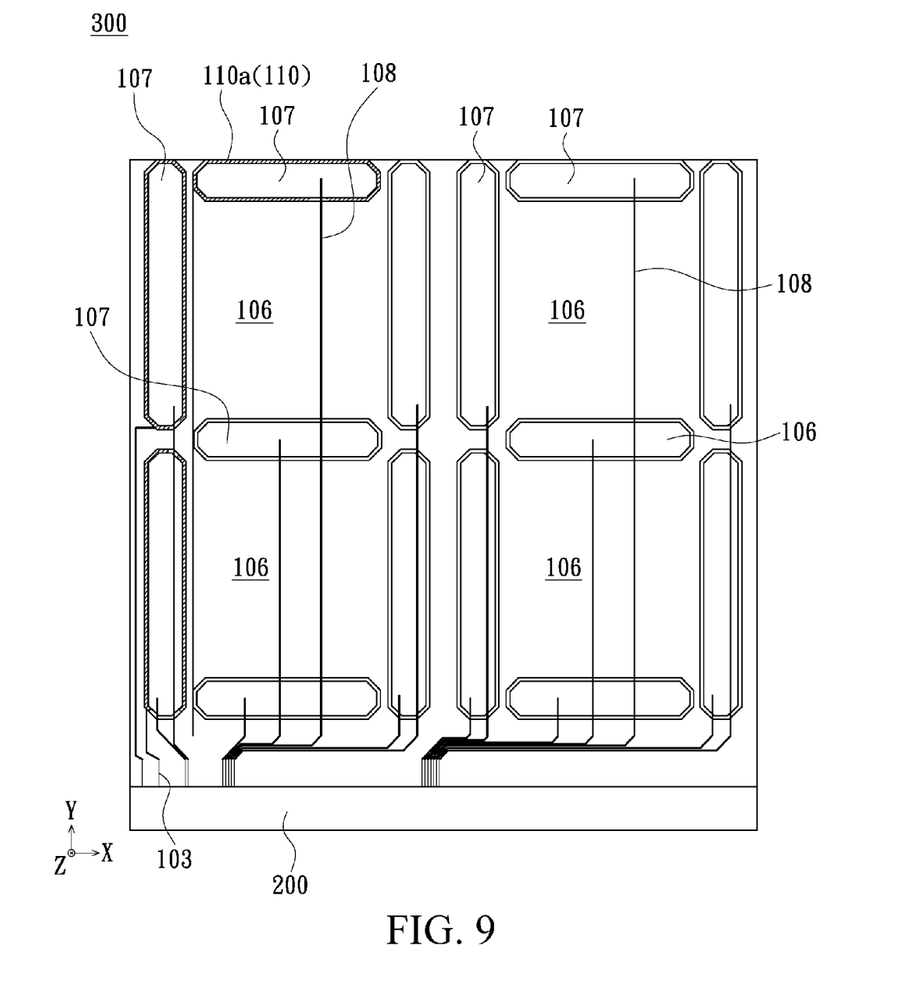
FIG. 9 shows a schematic top view of a display device according to a still further embodiment of the present invention.

In the present invention, setting situations of the pixel electrodes in the display device are not limited to the setting situations of the first pixel electrodes 106 that are shown in the display devices 100, 100', 100'', and 100''' shown in the foregoing embodiments and that have substantially the same appearances. FIG. 9 shows a schematic top view of a display device 300 according to a still further embodiment of the present invention. In this embodiment, in addition to the configurations of the plurality of first pixel electrodes 106 in FIG. 9 that are arranged in an array form in an X direction, the display device 300 further includes a plurality of second pixel electrodes 107 that are respectively disposed on a periphery of one of these first pixel electrodes 106 and are respectively electrically connected to one of the signal lines 108. These first auxiliary electrodes 110a are respectively disposed, in a direction perpendicular to the first substrate 102, between these first pixel electrodes 106 and these second pixel electrodes 107, and are respectively electrically connected to the control element 200 by using one of these signal lines 108.

These first pixel electrodes 106 and these second pixel electrodes 107 are respectively electrically connected to the control element 200 by using one signal line 108. Herein, the area of the first pixel electrode 106 is different from that of the second pixel electrode 107. In this embodiment, reference may be made to the situations shown in the foregoing embodiments. The auxiliary electrode layer 110 is disposed on a part close to the first pixel electrodes 106 and the second pixel electrodes 107. The auxiliary electrode layer 110 includes the first auxiliary electrodes 110a disposed substantially surrounding the first pixel electrodes 106 or the second pixel electrodes 107. Moreover, the auxiliary electrode layer 110 is also electrically connected to the control element 200 by using a signal line 108. Merely some of the first auxiliary electrodes 110a are drawn in the figures. However, the other first pixel electrodes 106 or second pixel electrodes 107 may also be provided with the first auxiliary electrodes 110a that surround the same. Similar to the foregoing embodiments, the signal line 108 is connected to a metal line 103, so as to be electrically connected to the control element 200.

In the embodiment shown in FIG. 9, by means of configurations of the plurality of first auxiliary electrodes 110a respectively connected to the control element 200, proper potentials, for example, pixel potentials or common potentials, may be given to these first auxiliary electrodes 110a by using the control unit 200 during operation of the display device 300. In this way, a problem of falling directions of liquid crystals between the adjacent first pixel electrodes 106 and second pixel electrodes 107 may be improved, and a problem of bright lines that may occur between the adjacent first pixel electrodes 106 and second pixel electrodes 107 during the operation of the display device 300 is eliminated, thereby improving the display performance of the display device 300.

In the plurality of embodiments shown in FIG. 1 to FIG. 9, the first substrate 102 and the second substrate 170 are made of, for example, glass, organic materials, or other proper materials. The dielectric layer 104 may be of a single-layer structure or a multilayer structure, and the material thereof may be, for example, an inorganic material (for example: silicon oxide, silicon nitride, silicon oxynitride, another proper material, or a combination of the foregoing materials), an organic material (for example: photoresist (including color resist or transparent resist), polyimide (PI), benzocyclobutene (BCB), epoxy, perfluorocyclobutane (PFCB), another proper material, or a combination of the foregoing materials), or another proper material, or a combination of the foregoing materials. In consideration of electrical conductivity, the metal layer 103 may be of a single-layer structure or a multilayer structure, and is preferably made of a conductive material such as a metal, an alloy, a metallic oxide, a metal nitride, or a metallic oxynitride, or another proper material. Each of the signal lines 108, the first pixel electrode 106, the second pixel electrode 107, the first auxiliary electrode 110a, the second auxiliary electrode 110b, the third auxiliary electrode 110c, and the fourth auxiliary electrode 110d may be a single layer or multiple layers, and materials thereof are transparent conductive materials having light transmittance greater than 80%, for example, may be an indium-tin oxide, an indium-zinc oxide, an aluminum-tin oxide, an aluminum-zinc oxide, an indium germanium zinc oxide, another proper oxide, or a stacked layer of at least two of the foregoing materials. In addition, the foregoing other components may be manufactured by using processes of conventional array substrates, and therefore, related manufacturing thereof is not described in detail herein.

Figure 10:
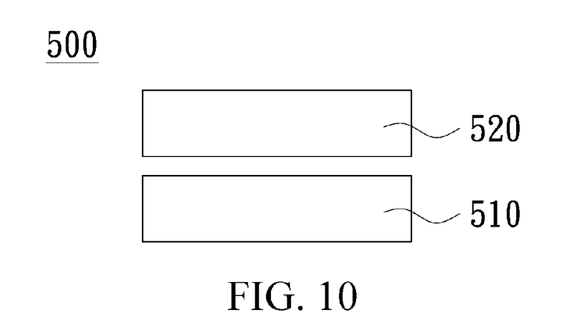
FIG. 10 shows a cross-sectional schematic view of a display device according to another embodiment of the present invention.

FIG. 10 shows a cross-sectional schematic view of a display device 500 according to another embodiment of the present invention. In this embodiment, the display device 500 includes a display panel 510, such as the display device 100, 100', 100'', 100''', or 300 in the foregoing embodiments. However, another display device 520 may be disposed above the foregoing display panel. In an embodiment, the display device 520 is an active display panel. In this embodiment, the display device 510 may be used as a shutter of a backlight module. The luminance of the display device 510 is adjusted corresponding to a display image of the display device 520, so that entire contrast of the display device 500 can be improved, thereby achieving the effect of local dimming.

Figure 11:
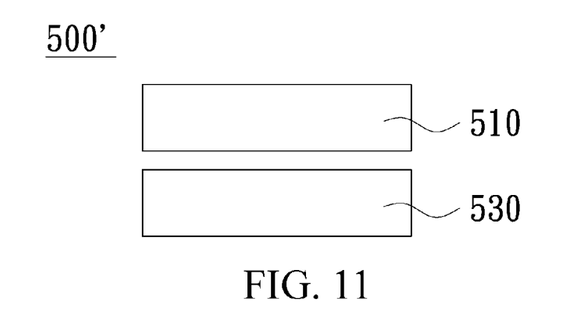
FIG. 11 shows a cross-sectional schematic view of a display device according to still another embodiment of the present invention.

FIG. 11 shows a cross-sectional schematic view of a display device 500' according to still another embodiment of the present invention. In this embodiment, the display device 500' includes a display device 510, such as the display device 100, 100', 100", 100''', or 300 in the foregoing embodiments. However, another display panel 530 may be disposed below the foregoing display device. In an embodiment, the display panel 510 is a scattering display panel. In this embodiment, a liquid crystal layer in the display device 510 may be used in cooperation with a polymer network liquid crystal (PNLC) or a polymer dispersed liquid crystal (PDLC). When the display device 500' is operated outdoors, the display device 510 may use scattering display; and when the display device 500' is operated indoors, the display device 510 may be switched to a transparent state, and the display panel 530 is used to display images.

The present invention is disclosed through the foregoing embodiments; however, these embodiments are not intended to limit the present invention. Various changes and modifications made by persons of ordinary skill in the art without departing from the spirit and scope of the present invention shall fall within the protection scope of the present invention. The protection scope of the present invention is subject to the appended claims.

What is claimed is:
1. A display device, comprising:
a first substrate;
a second substrate;
a liquid crystal layer, disposed between the first substrate and the second substrate;
a plurality of signal lines, disposed on the first substrate and extended in a first direction;
a dielectric layer, disposed on the plurality of signal lines;
a plurality of first pixel electrodes, disposed on the dielectric layer, wherein each first pixel electrode is electrically connected to one of the signal lines respectively;
an auxiliary electrode layer disposed between the first substrate and the dielectric layer; and
a control element, disposed on the first substrate and electrically connected to these signal lines and the auxiliary electrode layer;
wherein the auxiliary electrode layer is at least partially located, in a vertical projection on the first substrate, between two adjacent first pixel electrodes, and at least some of the signal lines and some of the first pixel electrodes overlap with each other in the vertical projection on the first substrate;
wherein the first pixel electrodes are arranged into a plurality of columns and a plurality of rows, the auxiliary electrode layer comprises a plurality of third auxiliary electrodes respectively located between two adjacent rows of the first pixel electrodes in the vertical projection on the first substrate, and the third auxiliary electrodes are extended perpendicularly to the first direction; and
wherein the third auxiliary electrodes gradually increase lengths as further away from the control element.

2. The display device according to claim 1, wherein the auxiliary electrode layer and the signal lines are in one film layer.

3. The display device according to claim 1, wherein light transmittance of the signal lines and the auxiliary electrode layer is greater than 80%.

4. The display device according to claim 1, wherein the first pixel electrodes are arranged into a plurality of columns and a plurality of rows, the auxiliary electrode layer comprises a plurality of first auxiliary electrodes extended in the first direction, and these first auxiliary electrodes are located, in the vertical projection on the first substrate, between two adjacent columns of the first pixel electrodes.

5. The display device according to claim 4, wherein the auxiliary electrode layer is not disposed between two adjacent rows of the first pixel electrodes in the vertical projection on the first substrate.

6. The display device according to claim 5, further comprising an alignment layer disposed between the first pixel electrodes and the liquid crystal layer, wherein the first auxiliary electrodes are extended in the first direction, the liquid crystal layer is a positive liquid crystal, and the alignment layer is aligned perpendicularly to the first direction.

7. The display device according to claim 5, further comprising an alignment layer disposed between the first pixel electrodes and the liquid crystal layer, wherein the first auxiliary electrodes are extended in the first direction, the liquid crystal layer is a negative liquid crystal, and the alignment layer is aligned parallel to the first direction.

8. The display device according to claim 4, wherein the auxiliary electrode layer further comprises a second auxiliary electrode extended in a second direction perpendicular to the first direction, and the first pixel electrodes are located between the second auxiliary electrode and the control element in the first direction.

9. The display device according to claim 1, wherein the auxiliary electrode layer is not disposed between two adjacent columns of the first pixel electrodes in the vertical projection on the first substrate.

10. The display device according to claim 9, further comprising an alignment layer disposed between the pixel electrodes and the liquid crystal layer, wherein the liquid crystal layer is a positive liquid crystal, and the alignment layer is aligned parallel to the first direction.

11. The display device according to claim 9, further comprising an alignment layer disposed between the pixel electrodes and the liquid crystal layer, wherein the liquid crystal layer is a negative liquid crystal, and the alignment layer is aligned perpendicularly to the first direction.

12. The display device according to claim 1, further comprising a plurality of second pixel electrodes respectively disposed on a periphery of one of the first pixel electrodes and respectively electrically connected to one of the signal lines, wherein the first pixel electrode is different in size from the second pixel electrode.

13. The display device according to claim 12, wherein the auxiliary electrode layer further comprises a plurality of first auxiliary electrodes respectively disposed between the first pixel electrodes and the second pixel electrodes in the vertical projection on the first substrate, and are respectively electrically connected to the control element via one of the signal lines.

14. The display device according to any one of claim 1, further comprising a display panel disposed laterally above the second substrate, wherein the display panel is an active display panel.

15. The display device according to any one of claim 1, further comprising a display panel disposed laterally below the first substrate, wherein the liquid crystal layer is a polymer network liquid crystal or a polymer dispersed liquid crystal.

16. A display device, comprising:
a first substrate;
a second substrate;
a liquid crystal layer, disposed between the first substrate and the second substrate;

a plurality of signal lines, disposed on the first substrate and extended in a first direction;

a dielectric layer, disposed on the plurality of signal lines;

a plurality of first pixel electrodes, disposed on the dielectric layer, wherein each first pixel electrode is electrically connected to one of the signal lines respectively;

an auxiliary electrode layer disposed between the first substrate and the dielectric layer; and a control element, disposed on the first substrate and electrically connected to these signal lines and the auxiliary electrode layer;

wherein the auxiliary electrode layer is at least partially located, in a vertical projection on the first substrate, between two adjacent first pixel electrodes, and at least some of the signal lines and some of the first pixel electrodes overlap with each other in the vertical projection on the first substrate;

wherein the auxiliary electrode layer further comprises a plurality of fourth auxiliary electrodes, each of these fourth auxiliary electrodes overlaps with one of the first pixel electrodes in the vertical projection on the first substrate, and width of the fourth auxiliary electrodes gradually increases along the first direction; and wherein each of the fourth auxiliary electrodes and the corresponding first pixel electrode have a first overlap area in a direction perpendicular to the first substrate, and the first overlap areas corresponding to the first pixel electrode gradually increase as further away from the control element.

17. The display device according to claim 16, wherein in each of the first pixel electrodes, the signal lines and the corresponding first pixel electrodes have a second overlap area in the direction perpendicular to the first substrate, and each of the first pixel electrodes corresponds to a sum of the first overlap area and the second overlap area, and variations between the sums corresponding to these first pixel electrodes are less than 20%.

\* \* \* \* \*